(No Model.) 2 Sheets—Sheet 1.

J. W. ELLIOTT.
COTTON ELEVATOR AND DISTRIBUTER.

No. 571,473. Patented Nov. 17, 1896.

Witnesses
Jas. V. McCathran

By his Attorneys, James W. Elliott
C. A. Snow & Co.

(No Model.) 2 Sheets—Sheet 2.

J. W. ELLIOTT.
COTTON ELEVATOR AND DISTRIBUTER.

No. 571,473. Patented Nov. 17, 1896.

Witnesses
Jas. L. McCathran

Inventor
James W. Elliott
By his Attorneys,
C. A. Snow & Co.

UNITED STATES PATENT OFFICE.

JAMES W. ELLIOTT, OF CORSICANA, TEXAS.

COTTON ELEVATOR AND DISTRIBUTER.

SPECIFICATION forming part of Letters Patent No. 571,473, dated November 17, 1896.

Application filed July 30, 1895. Serial No. 557,634. (No model.)

*To all whom it may concern:*

Be it known that I, JAMES W. ELLIOTT, a citizen of the United States, residing at Corsicana, in the county of Navarro and State of Texas, have invented a new and useful Cotton Elevator and Distributer, of which the following is a specification.

My invention relates to cotton elevating and distributing devices, and has for its object to provide a simple and efficient construction and arrangement of parts whereby seed-cotton may be fed to a plurality of gins simultaneously with the minimum loss of time and exertion upon the part of the operator.

Further objects and advantages of this invention will appear in the following description, and the novel features thereof will be particularly pointed out in the appended claims.

Figure 1:
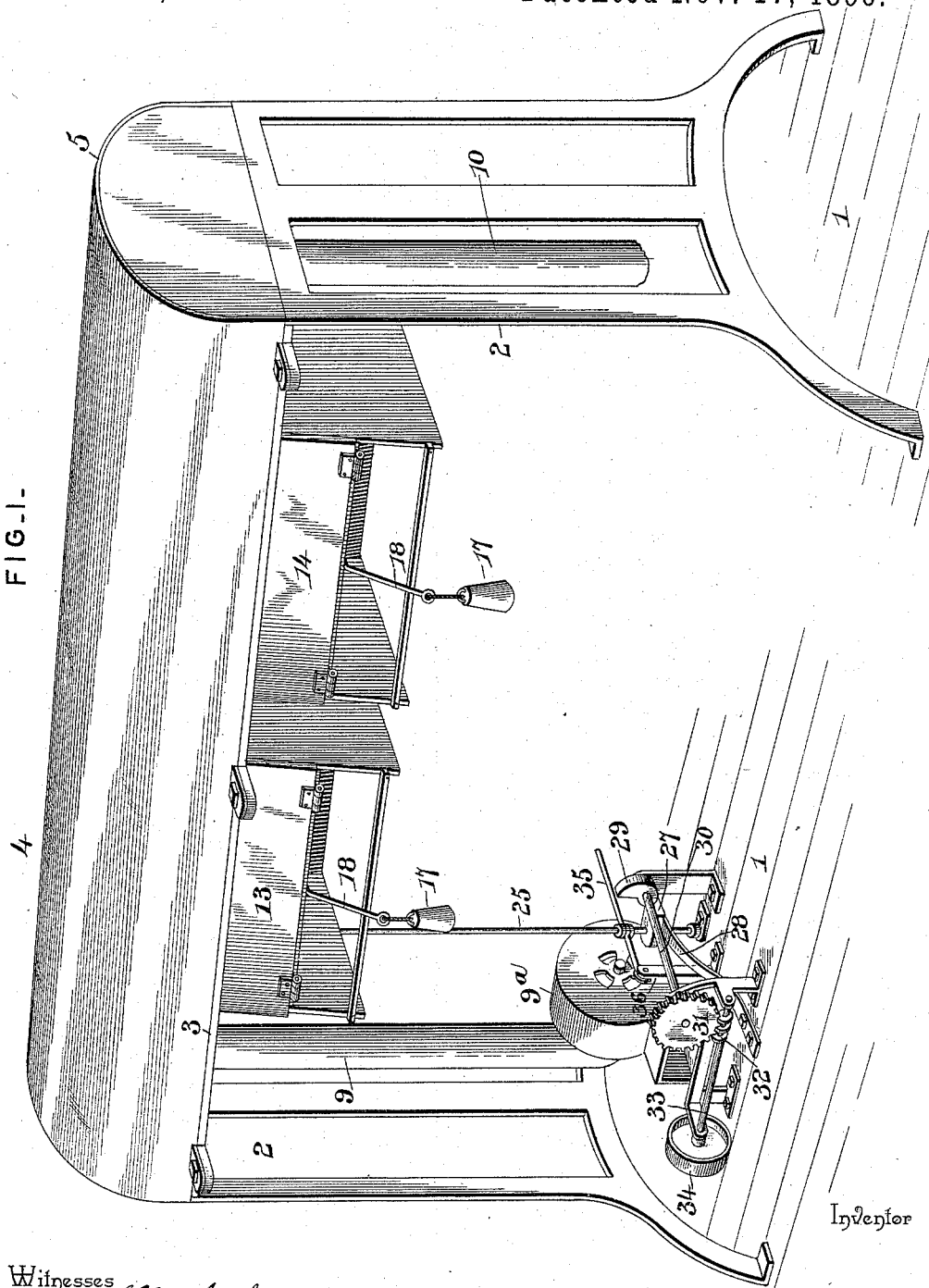
Figure 2:
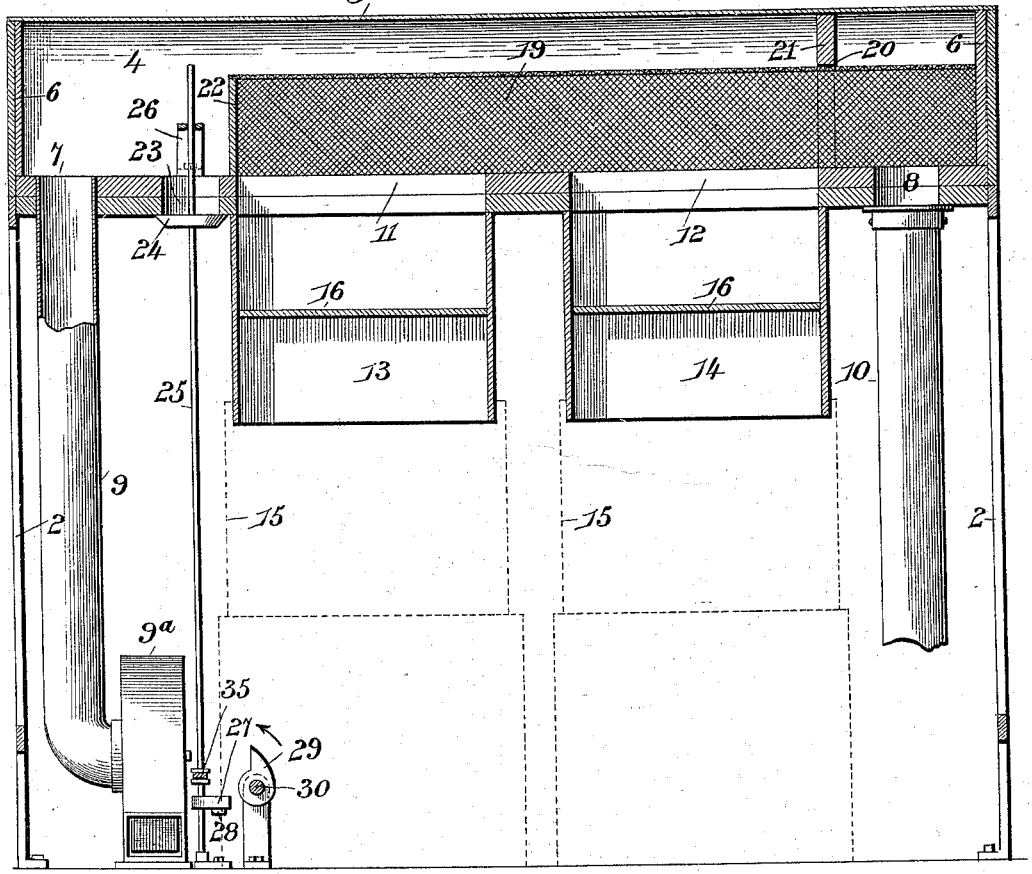
Figure 3:
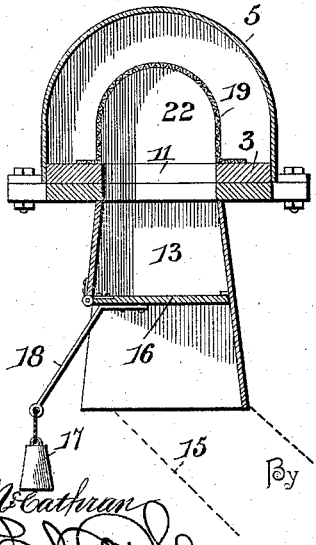
Figure 4:
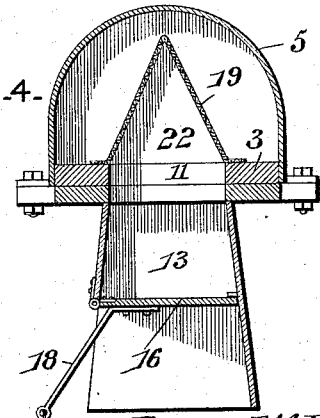

In the drawings, Figure 1 is a perspective view of a device embodying my invention. Fig. 2 is a vertical longitudinal section of the same. Fig. 3 is a transverse vertical section of the vacuum-box and one of the feeders or chutes. Fig. 4 is a similar view showing a slightly-modified form of screen.

Similar numerals of reference indicate corresponding parts in all the figures of the drawings.

1 designates a base or platform from which rise standards 2, connected by an elevated floor 3, forming the floor of a vacuum distributer-box 4. The distributer-box is of cross-sectionally segmental construction, having an arched cover 5, extending longitudinally between the standards and supported by the floor 3, the ends of said cover being closed by heads 6. In the floor at opposite ends thereof are formed openings 7 and 8, with the former of which communicates a suction-pipe or pneumatic tube 9, adapted to be arranged in communication with a suction-fan, as at 9ª, and with the latter of which communicates a conductor 10, adapted to be arranged at its lower end in position to receive the cotton from the load.

Arranged in communication with intermediate elongated openings 11 and 12 are the feeders 13 and 14, adapted to be connected by chutes 15, extending to the cotton-gins, (not shown,) which are located upon the base or platform 1, as indicated by dotted lines in Fig. 3. Arranged in the feeders are pivotal valves 16, adapted to close the feeders and supported in their closed positions by means of weights 17, attached to rearwardly-extending arms 18.

Extending over the openings 11 and 12 and the opening 8, with which communicates the conductor 10, is a continuous arched screen 19, extending through an opening 20 in a transverse partition 21 and terminating at the end remote from said conductor 10 in a head 22. In the construction illustrated in Fig. 3 the screen is arranged in the form of a cross-sectionally-curved arch, while in Fig. 4 it is shown in the form of a V-shaped or tapered arch, and in either case the arch is spaced from the inner surface of the arched cover of the distributer-box, whereby when the exhaust-fan is in operation cotton is elevated through the vertical conductor and is drawn by the blast into contact with the inner surface of the horizontal screen over the elongated openings 11 and 12 in the floor.

An inlet-opening 23 is formed in the floor 3, adjacent to the head 22 at one end of the screen, and arranged in operative relation with said opening to close the same is a relief-valve 24, provided with a stem 25, which extends through the opening, and a guide-perforation formed in a bracket 26, arranged within the distributer-box. This valve-stem is provided with a foot 27, arranged in operative relation with a spring 28 and in the path of a cam 29, carried by a shaft 30, whereby as said shaft rotates the cam is brought into contact with the foot 27 and the stem is depressed to open the relief-valve. Motion is communicated to said shaft by means of a gear 31 on one end thereof and a worm 32, meshing with said gear and carried by a driving-shaft 33. This driving-shaft may receive motion by any suitable means, as a belt-wheel 34. In addition to the above-described means for operating the valve I also employ a hand-lever 35, fulcrumed upon a standard 36 and connected at an intermediate point to the valve-stem.

When the suction-fan has operated a sufficient length of time to cause an accumulation of cotton upon the inner surface of the screen above the openings 11 and 12, the relief-valve is opened to destroy the effect of the suction-fan, whereupon the cotton falls through the openings 11 and 12 to the valves arranged in the feeders, and the weight of the cotton depresses or opens the valves and passes through the chutes to the gins.

From the above description it will be seen that I employ a single continuous screen extending over the plurality of openings communicating with feeders valved to prevent the influx of air during the elevation of the cotton, and said continuous screen provides for the regular distribution of the cotton over the inner surface thereof in position to fall directly into the feeders when the effect of the suction is destroyed by the opening of the relief-valve. As the cotton ascends through the conductor and enters the screen it is drawn by the blast against the latter, and it is obvious that at that point the draft of air is partially or entirely cut off, whereby successive particles of cotton entering the screen are drawn by the blast to other portions of the surface of the screen. This operation continues until the entire inner surface of the screen is covered by the cotton against which it is held by the suction produced by the fan. It is obvious that as soon as this suction ceases or is destroyed by the sudden influx of air, as by the opening of the relief-valve, the atmospheric pressure by which the cotton is held in contact with the inner surface of the screen is removed and the cotton is allowed to fall vertically into the feeders.

In order to provide as extensive a surface for the accumulation of cotton as possible, the screen is made, as above described, to extend continuously over the feeders and is arched, in the manner described, from the plane of the floor and thus forms in the curved arch an expanse greater than a semicircle, and in the V-shaped form an expanse equal to two sides of a triangle. The lower edges of the screen are arranged contiguous to the edges of the openings in the floor to prevent cotton from hanging upon the edges of the latter after being released from the screen.

Various changes in the form, proportion, and the minor details of construction may be resorted to without departing from the spirit or sacrificing any of the advantages of this invention.

Having described my invention, what I claim is—

1. In a cotton elevator and distributer, a horizontal vacuum-box provided in the floor thereof with a plurality of cotton-discharge openings, and with an air-inlet opening, a horizontal continuous arched screen provided with imperforate closed ends and supported at its edges on the floor of the box so as to extend continuously over the cotton-discharge openings, said screen being of a smaller cross-sectional area than the vacuum-box, an exhaust suction-pipe communicating with the interior of the box beyond one of the closed ends of the screen, a suction supply-pipe connected with the floor of the box near one end so as to communicate with the interior of the arched screen and disposed at right angles to the length of said screen to provide for the direct delivery of cotton against the inner surface of the screen, and an intermittently-operated valve working over said air-inlet opening, substantially as set forth.

2. In a device of the class described, the combination of a distributer-box, feeders in communication with openings in the floor of the distributer-box, a screen extending over said openings, a conductor communicating with the space inclosed by the screen, a pneumatic tube, an exhaust apparatus, a valve arranged in operative relation with an inlet-opening in the distributer-box and spring-actuated to hold it normally seated, a cam 29 and means for communicating continuous motion to the same, and a foot 27 carried by the stem of said valve in the path of the cam and adapted to be engaged at intervals thereby to open the valve and equalize the pressure upon both sides of the screen, whereby the cotton in contact with the inner surface of the screen may fall by gravity into the feeders, substantially as specified.

In testimony that I claim the foregoing as my own I have hereto affixed my signature in the presence of two witnesses.

JAMES W. ELLIOTT.

Witnesses:
H. G. DAMON,
RALPH BEATON.